United States Patent
Shamsi

(10) Patent No.: US 11,589,011 B1
(45) Date of Patent: Feb. 21, 2023

(54) BEZELS WITH CAMERAS AND LIGHT SOURCES

(71) Applicant: HEWLETT-PACKARD DEVELOPMENT COMPANY, L.P., Spring, TX (US)

(72) Inventor: Osaid Ahmed Shamsi, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/443,976

(22) Filed: Jul. 29, 2021

(51) Int. Cl.
*H04N 7/18* (2006.01)
*G02F 1/1335* (2006.01)
*H05B 45/12* (2020.01)

(52) U.S. Cl.
CPC ....... *H04N 7/183* (2013.01); *G02F 1/133618* (2021.01); *H05B 45/12* (2020.01)

(58) Field of Classification Search
CPC .... H04N 7/183; G02F 1/133618; H05B 45/12
USPC ....................................................... 348/143
See application file for complete search history.

(56) References Cited

U.S. PATENT DOCUMENTS

| | | | |
|---|---|---|---|
| 8,827,524 B2 | 9/2014 | Huang | |
| 2009/0213093 A1* | 8/2009 | Bridger | G06F 3/0421 345/175 |
| 2012/0274734 A1* | 11/2012 | Byers | H04N 7/144 348/E7.079 |
| 2014/0334142 A1* | 11/2014 | Levante | F21S 4/22 362/222 |
| 2015/0092334 A1* | 4/2015 | Hayashida | G06F 1/1601 361/679.21 |
| 2018/0321739 A1* | 11/2018 | Park | G06F 3/04842 |
| 2020/0267907 A1* | 8/2020 | Conrad | A01G 9/249 |

OTHER PUBLICATIONS

Cunningham, Andrew, Wirecutter, The Best All-in-One Computer, Apr. 20, 2021 (37 pages).
Gordon, Whitson, Shop Today, Tech & Gadgets, The best webcams for 2021: best work-from-home webcams, Nov. 26, 2020 (16 pages).
The Smartphone Photographer, Everything About Smartphone Camera Flash, 2019 (31 pages).

* cited by examiner

*Primary Examiner* — Allen C Wong
(74) *Attorney, Agent, or Firm* — Quarles & Brady LLP

(57) ABSTRACT

In some examples, a computer includes a display panel, a bezel around the display panel, a camera, and a plurality of separate light sources integrated into the bezel at respective different locations.

15 Claims, 3 Drawing Sheets

BEZELS WITH CAMERAS AND LIGHT SOURCES

BACKGROUND

A computer can include a built-in camera that faces a user of the computer. The camera, when activated, can capture an image of the user who faces a display panel of the computer.

BRIEF DESCRIPTION OF THE DRAWINGS

Some implementations of the present disclosure are described with respect to the following figures.

Figure 1:
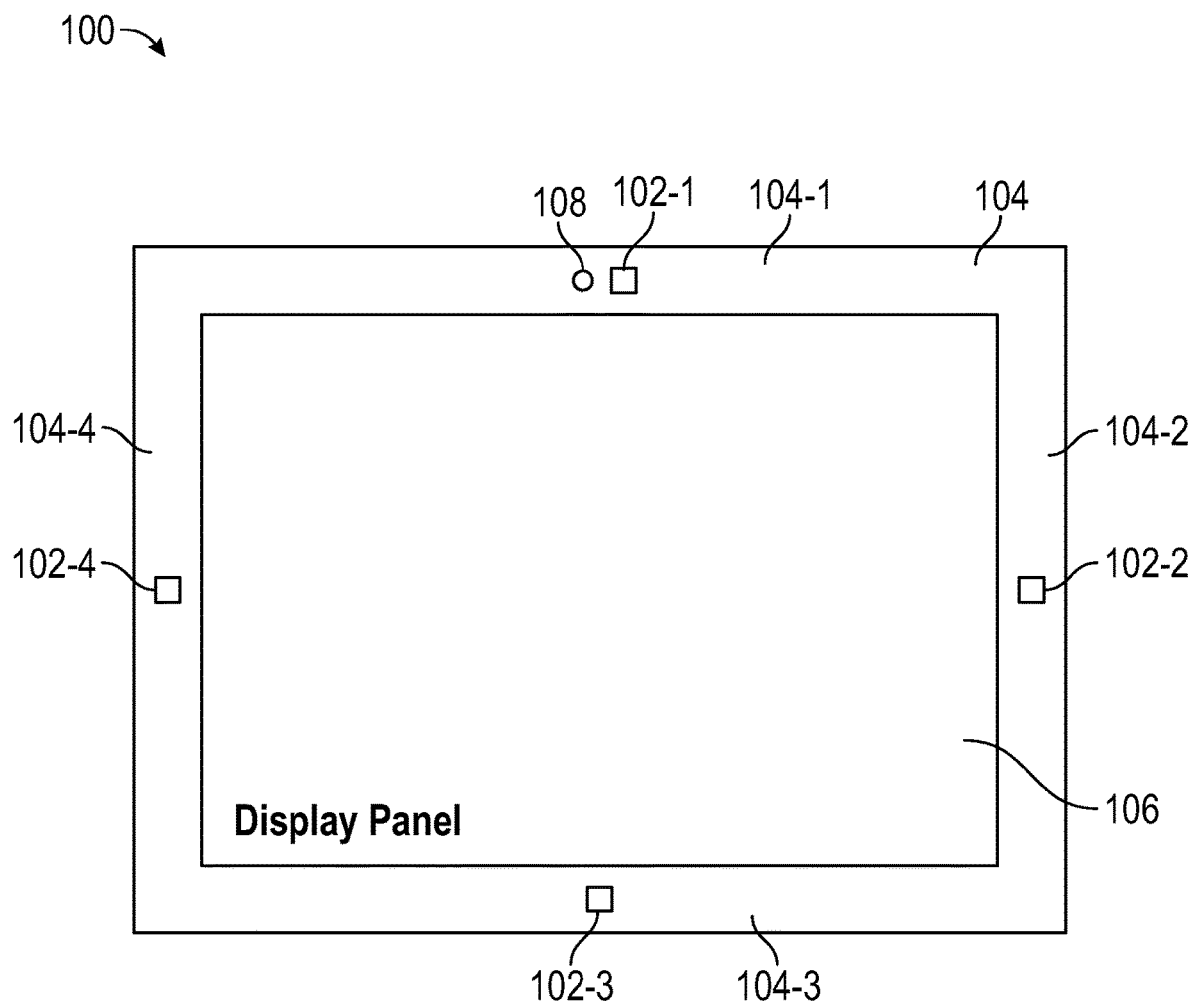
FIGS. 1 and 2 are diagrams of computers including display bezels and cameras and light sources integrated in the display bezels, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

When a camera of a computer is used in a poor ambient light condition, the quality of an image acquired by the camera can be poor. A user may use the camera as part of an online video call. If the computer is in a poor ambient light condition, then the quality of video image of the user and/or another object may suffer.

To address this issue, a user can purchase an external light source to use with the camera of the computer. The external light source can be physically attached to the computer, or can be placed in the proximity of the computer. The external light source, when activated, can provide light illumination for the camera, so that the camera can capture a higher quality image of the user and/or another object.

Having to purchase an external light source to use with a computer's built-in camera can add to the cost associated with use of the computer. Moreover, a user has to figure out how to connect the external light source to the computer to allow the external light source to work properly with the camera. Additionally, in some cases, the user may have to manually activate or deactivate the external light source, or the user may have to manually control a property of the external light source, such as its brightness, intensity, and hue.

In accordance with some implementations of the present disclosure, as depicted in FIG. 1, multiple different light sources 102-1, 102-2, 102-3, and 102-4 are integrated into a bezel 104 of a computer 100. Although four light sources are shown in the example of FIG. 1, it is noted that in other examples, a different number of multiple light sources can be used.

In some examples, a first light source of the multiple separate light sources 102-1 to 102-4 shown in FIG. 1 is spaced apart from a second light source of the multiple separate light sources by greater than 15 centimeters (cm) or another threshold distance.

A "bezel" of a computer can refer to a physical border region that is part of or attached to a housing of the computer 100, where the physical border region can surround a display panel, such as a display panel 106 that is part of the computer 100 of FIG. 1. A display panel can include a liquid crystal display (LCD) panel, a light emitting diode (LED) panel, or another type of display panel. Generally, a "display panel" can refer to an arrangement of circuitry associated with pixels, where the circuitry is activatable to control light emitted by or passed through respective pixels.

The bezel 104 can be formed of any of various types of materials, such as aluminum or another metal, plastic, or another material. The bezel 104 surrounding or being around the display panel 106 can refer to the bezel 104 completely surrounding the display panel 106, or partially surrounding the display panel 106.

In examples according to FIG. 1, the bezel 104 has a generally rectangular shape, with four respective bezel segments 104-1, 104-2, 104-3, and 104-4 on the corresponding different sides of the rectangle. The "generally" rectangular shape of the bezel 104 may not be a perfect rectangle, but instead, can have a rounded corners.

In other examples, the bezel 104 can have a different shape, such as a circular or oval shape, a triangular shape, another polygonal shape, and so forth.

In the example of FIG. 1, the four bezel segments 104-1, 104-2, 104-3, and 104-4 are angled with respect to each other. For example, the bezel segment 104-1 is generally perpendicular to each of the bezel segments 104-2 and 104-4. Similarly, the bezel segment 104-2 is generally perpendicular to each of bezel segments 104-1 and 104-3. The bezel segment 104-4 is generally perpendicular to each of bezel segments 104-1 and 104-3.

A first bezel segment is generally perpendicular to a second bezel segment if the angle between the first bezel segment and the second metal segment is in a range between 80° to 100°, or another range, for example.

FIG. 1 also shows a built-in the camera 108 of the computer 100, which is integrated into the bezel 104. In the example of FIG. 1, the camera 108 is integrated into the bezel segment 104-1.

Although FIG. 1 shows an example with just one camera 108, it is noted that in other examples, multiple cameras can be provided in the bezel 104. For example, multiple cameras can be integrated into the bezel segment 104-1, or into multiple bezel segments of the bezel 104.

A camera or a light source is "integrated" into the bezel 104 if the camera or a light source is attached to or mounted in the bezel 104.

By providing a multiple light sources 102-1 to 102-4 around different locations of the bezel 104, ring light illumination can be provided for the camera 108. "Ring light illumination" can refer to an illumination in which light is emitted from multiple locations along a periphery. FIG. 1 shows an example in which the ring light illumination is provided from light sources 102-1 to 102-4 at discrete locations.

In further examples, more light sources can be integrated into the bezel 104 to provide more light sources to enhance the ring light illumination effect. Ring light illumination can provide a more uniform illumination from multiple directions and/or angles.

Figure 2:
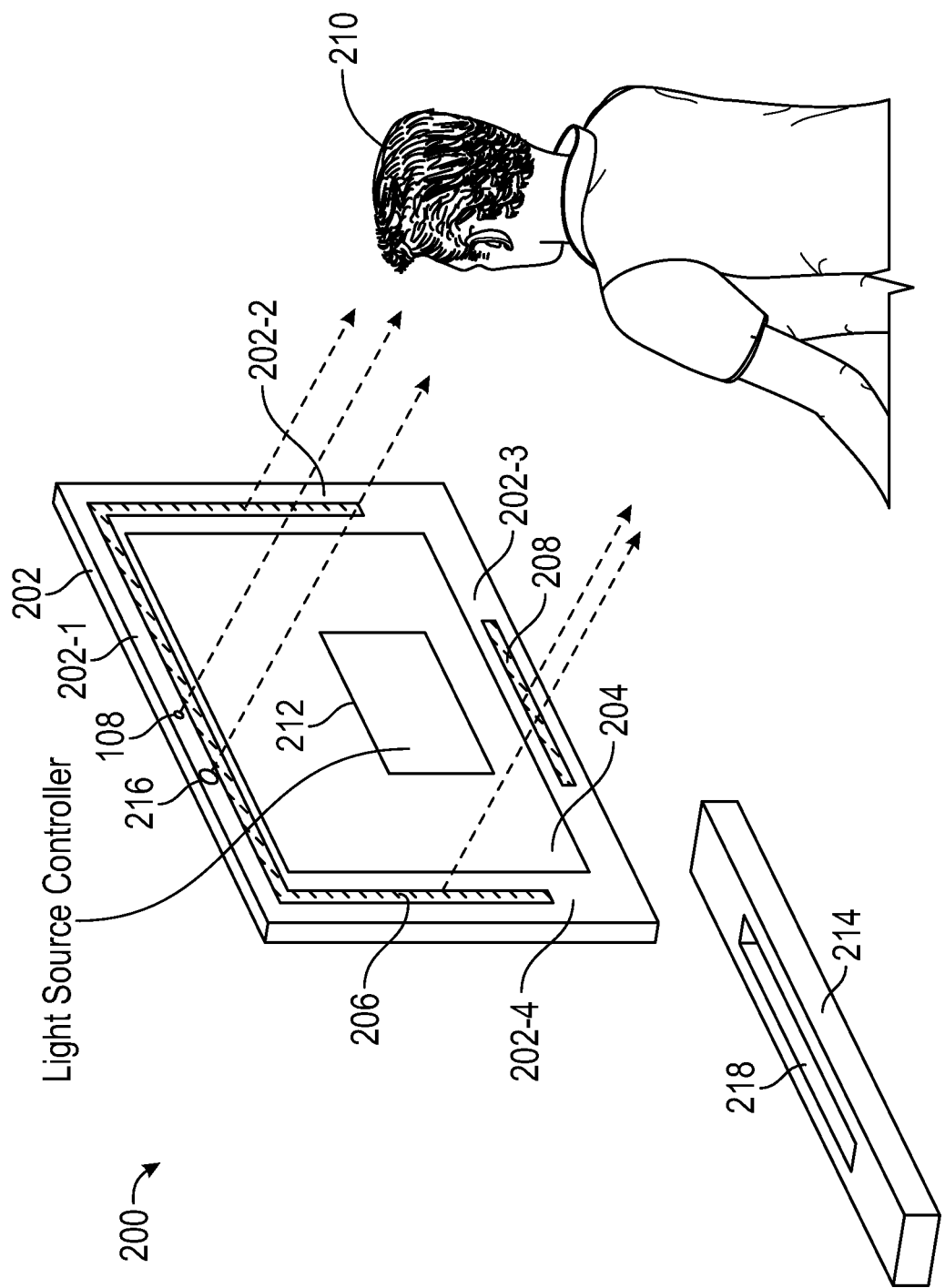

FIG. 2 shows an example of another computer 200 that has a built-in camera 108 integrated into a bezel 202 of the computer 200. The bezel 202 surrounds a display panel 204.

In examples according to FIG. 2, strips of LEDs 206 and 208 are employed as light sources. The strips of LEDs 206 and 208 are also integrated into the bezel 202 of the computer 200.

A "strip of LEDs" can refer to an arrangement in which multiple LEDs are mounted on a strip of material, such as a flexible circuit. In examples according to FIG. 2, the strip of LEDs 206 is integrated into and extends around multiple bezel segments at 202-1, 202-2, and 202-4 of the bezel 202. The strip of LEDs 208 is integrated into the bezel segment 202-3.

In further examples, instead of having a continuous strip of LEDs 206 that extends along the multiple bezel segments 202-1, 202-2, and 202-4, discrete strips of LEDs can be employed, a first strip integrated into the bezel segment 202-1, a second strip integrated into the bezel segment 202-2, and a third strip integrated into the bezel segment 202-4.

As shown in FIG. 2, the camera 108 and the light sources (in the form of the strips of LEDs 206 and 208) all face a user 210 when the user 210 sits in front of the display panel 204 of the computer 200, such that the user 210 can view images displayed by the display panel 204 while using the computer 200. A camera or a light source facing a user means that the user is in a field of view of the camera or light source while the user is using a computer including the camera or the light source.

More generally, the camera 108 and the light sources of FIG. 2 face generally in the same direction.

In the example of FIG. 1, the camera 108 and the light sources 102-1 to 102-4 similarly face a user of the computer 100.

In FIG. 2, when the camera 108 is activated to capture images, the strips of LEDs 206 and 208 can be correspondingly activated to provide ring light illumination of the user 210 or another object in front of the computer 200.

As shown in FIG. 2, the computer 200 further includes a light source controller 212 that is used to control light sources of the computer 200, including the strips of LEDs 206 and 208. The light source controller 212 is electrically coupled to the camera 108 and the strips of LEDs 206 and 208.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In some examples, the light source controller 212 is part of a super input/output (I/O) chip of the computer 200. A super I/O chip is a class of I/O controller that is used to control a number of I/O devices of a computer, and can provide various functionalities, such as port control, interfaces to sensors, fan speed control, and so forth.

In other examples, if the computer 200 is capable of docking to a docking station 214, then the light source controller 212 may be part of a dock management controller that manages docking of the computer 200 to the docking station 214. The docking station 214 includes a docking connector 218 to physically and electrically connect to a corresponding connector of the computer 200.

The docking station 214 can have various ports that allow the docking station 214 to connect to various peripheral devices, such as a keyboard, a mouse device, another input device, and so forth.

In some examples, the computer 200 further includes a light sensor 216. The light sensor 216 can be used to detect an ambient light condition around the computer 200, for example. Although FIG. 2 shows the light sensor 216 as being integrated into the bezel 202, it is noted that the light sensor 216 can be provided at a different location of the computer 200 in other examples.

The light source controller 212 can control a property of the strips of LEDs 206 and 208 based on various factors, such as (1) whether the camera 108 is active, and (2) an ambient light condition as detected by the light sensor 216. The property of the strips of LEDs 206 and 208 that can be controlled by the light source controller 212 based on the foregoing factors can include a brightness, an intensity, and/or a hue of lighting provided by the strips of LEDs 206 and 208.

If the camera 108 is not active (e.g., a user of the computer 200 has not selected a control element in the form of a graphical user interface (GUI) control element, a physical control button, etc., to cause the camera 108 to turn on to actively capture images), then the light source controller 212 can deactivate the strips of LEDs 206 and 208 such that the strips of LEDs 206 and 208 do not illuminate. However, if the light source controller 212 detects that the camera 108 has been activated to capture images, then the light source controller 212 can turn on the strips of LEDs 206 and 208.

In further examples, the control of the property of the strips of LEDs 206 and 208 can depend upon how much ambient light is present. If the ambient light level is high (e.g., exceeds a light level threshold), as detected by the light sensor 216, then the light source controller 212 can reduce the brightness or intensity of the strips of LEDs 206 and 208. However, if the ambient light condition is low (e.g., does not exceed the light level threshold), then the light source controller 212 can increase the brightness or intensity of the strips of LEDs 206 and 208.

Moreover, the light source controller 212 can determine a color of the ambient light, such as based on whether the ambient light is from natural light or light provided by an artificial light source. Based on the foregoing, the light source controller 212 can adjust the hue of the strips of LEDs 206 and 208.

More generally, the light source controller 212 can detect an ambient light around the computer, and to control the property of the light from light sources based on a characteristic (light level and type of light source, for example) of the ambient light.

Figure 3:
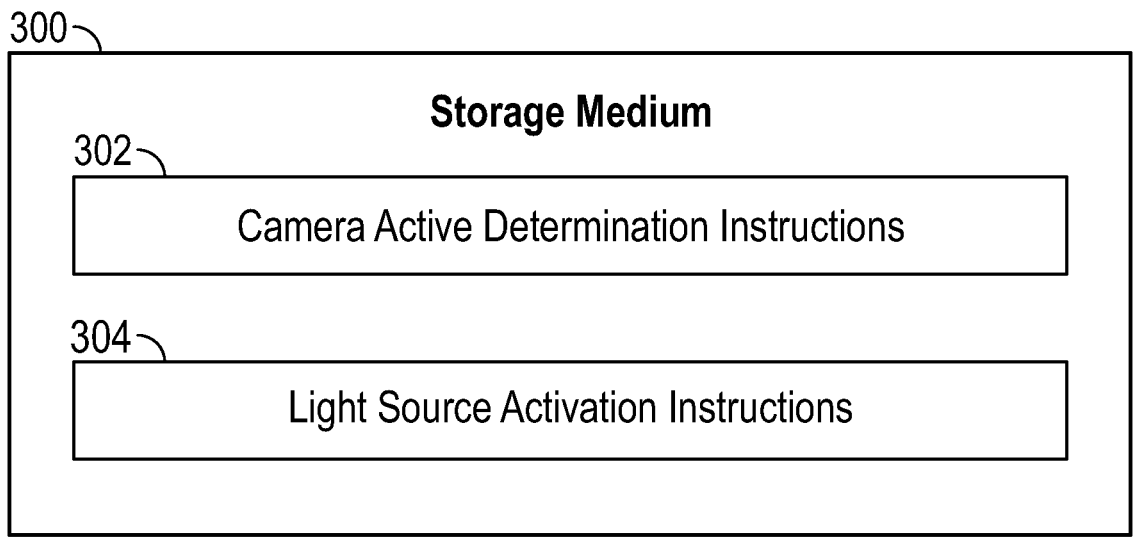
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a controller (e.g., the light source controller 212 of FIG. 2) in a computer to perform various tasks.

The machine-readable instructions include camera active determination instructions 302 to determine that a camera of the computer is active.

The machine-readable instructions include light source activation instructions 304 to, in response to determining that the camera is active, activate a plurality of different light sources integrated into a bezel of the computer, the bezel being around a display panel of the computer, and the activating of the plurality of different light sources to provide illumination for the camera.

The machine-readable instructions can deactivate the light sources if the camera is determined to be inactive.

A storage medium (e.g., 300 in FIG. 3) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 4:
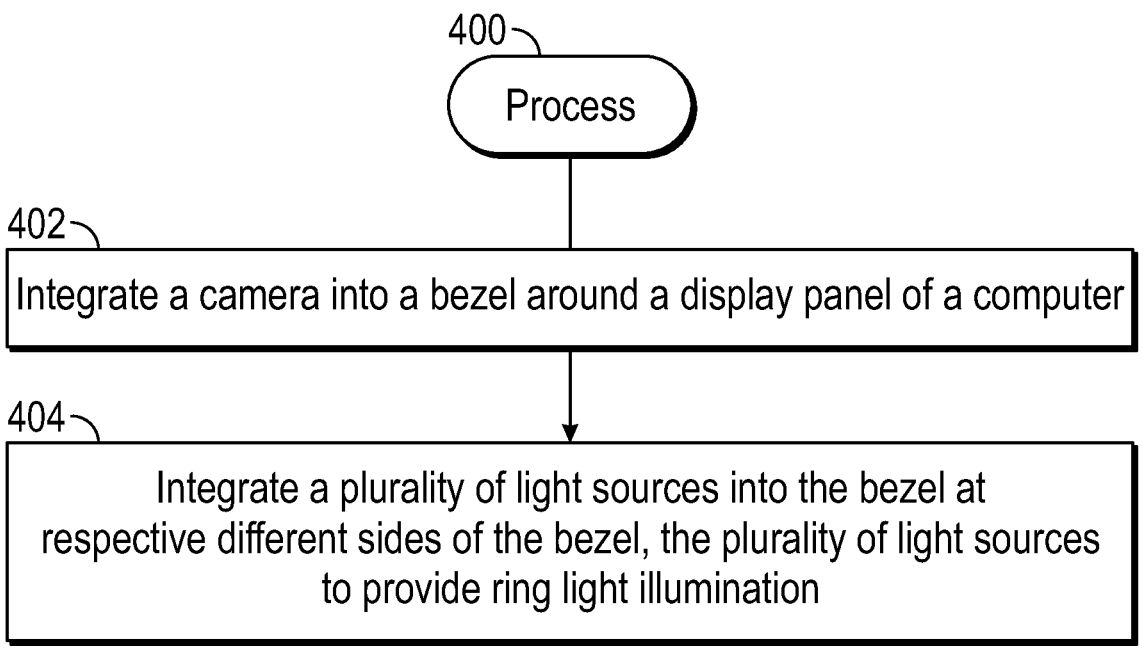
FIG. 4 is a flow diagram of a process of forming a computer, according to some examples.

FIG. 4 is a flow diagram of a process 400 of forming a computer, such as an all-in-one (AIO) computer, or an external monitor for use with a computer, for example.

The process 400 includes integrating (at 402) a camera into a bezel around a display panel of the computer.

The process 400 further includes integrating (at 404) a plurality of light sources into the bezel at respective different sides of the bezel, the plurality of light sources to provide ring light illumination for the camera.

In some examples, techniques or mechanisms are able to provide an ability to automatically activate light sources based on whether or not a camera of a computer is active, and further based on an ambient light condition. External light sources do not have to be employed, which can save on costs associated with use of a computer.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer comprising:
    a display panel;
    a bezel around the display panel;
    a camera; and
    a continuous strip of separate light sources integrated into the bezel at respective different locations, wherein the continuous strip of the separate light sources comprises a flexible circuit and the separate light sources mounted on the flexible circuit, wherein the continuous strip of the separate light sources extends along multiple bezel segments of the bezel, the multiple bezel segments angled with respect to one another, wherein the continuous strip comprises a plurality of strip portions integrated into respective bezel segments of the multiple bezel segments, each strip portion of the plurality of strip portions of the continuous strip comprising light sources, and wherein a first strip portion of the plurality of strip portions is angled with respect to a second strip portion of the plurality of strip portions, and a third strip portion of the plurality of strip portions is angled with respect to the second strip portion.

2. The computer of claim 1, wherein the light sources of the plurality of strip portions of the continuous strip provide ring light illumination.

3. The computer of claim 1, wherein the continuous strip of the separate light sources comprises light emitting diodes (LEDs) mounted on the flexible circuit.

4. The computer of claim 1, wherein a first light source of the separate light sources is spaced apart from a second light source of the separate light sources by greater than 15 centimeters.

5. The computer of claim 1, wherein the camera is integrated into the bezel, and faces in a same direction as the separate light sources.

6. The computer of claim 1, further comprising:
    a controller to control a property of light from the separate light sources.

7. The computer of claim 6, wherein the controller is to detect whether the camera is active, and to control the property of the light from the separate light sources based on the detection of whether the camera is active.

8. The computer of claim 6, wherein the controller is to detect an ambient light around the computer, and to control the property of the light from the separate light sources based on a characteristic of the ambient light.

9. The computer of claim 1, wherein the multiple bezel segments comprise a first bezel segment, second bezel segment that is generally perpendicular to the first bezel segment, and a third bezel segment that is generally perpendicular to the second bezel segment, and wherein the continuous strip of the separate light sources is integrated into and extends along the first bezel segment, the second bezel segment, and the third bezel segment.

10. The computer of claim 9, wherein the continuous strip of the separate light sources is U-shaped.

11. A non-transitory machine-readable storage medium comprising instructions that upon execution cause a controller in a computer to:
    determine that a camera of the computer is active; and
    in response to determining that the camera is active, activate a plurality of different light sources of a continuous strip integrated into a bezel of the computer, the bezel being around a display panel of the computer, and the activating of the plurality of different light sources to provide illumination for the camera, wherein the continuous strip comprises a flexible circuit and the plurality of different light sources are mounted on the flexible circuit, wherein the continuous strip of the plurality of different light sources extends along multiple bezel segments of the bezel, the multiple bezel segments angled with respect to one another, wherein the continuous strip comprises a plurality of strip portions integrated into respective bezel segments of the multiple bezel segments, each strip portion of the plurality of strip portions of the continuous strip comprising light sources, and wherein a first strip portion of the plurality of strip portions is angled with respect to a second strip portion of the plurality of strip portions, and a third strip portion of the plurality of strip portions is angled with respect to the second strip portion.

12. The non-transitory machine-readable storage medium of claim 11, wherein the instructions upon execution cause the controller to:

detect a level of ambient light around the computer; and adjust a property of the plurality of different light sources based on the level of the ambient light.

13. The non-transitory machine-readable storage medium of claim 11, wherein the instructions upon execution cause the controller to:

detect a color of ambient light around the computer; and adjust a property of the plurality of different light sources based on the color of the ambient light.

14. A method of forming a computer, comprising:

integrating a camera into a bezel around a display panel of the computer; and integrating a plurality of light sources into the bezel at respective different sides of the bezel, the plurality of light sources to provide ring light illumination for the camera, wherein the plurality of light sources are part of a continuous strip comprising a flexible circuit and the plurality of light sources are mounted on the flexible circuit, wherein the continuous strip extends along multiple bezel segments of the bezel, the multiple bezel segments angled with respect to one another, wherein the continuous strip comprises a plurality of strip portions integrated into respective bezel segments of the multiple bezel segments, each strip portion of the plurality of strip portions of the continuous strip comprising light sources, and wherein a first strip portion of the plurality of strip portions is angled with respect to a second strip portion of the plurality of strip portions, and a third strip portion of the plurality of strip portions is angled with respect to the second strip portion.

15. The method of claim 14, further comprising:

electrically coupling a controller to the camera and the plurality of light sources, the controller to control a property of the plurality of light sources based on a detection that the camera is active and on an ambient light condition around the computer.

\* \* \* \* \*